3,749,787
PHARMACEUTICAL COMPOSITIONS
Walter Hepworth and Gilbert Joseph Stacey, Macclesfield, Cheshire, England, assignors to Imperial Chemical Industries Limited, London, England
No Drawing. Original application Sept. 23, 1966, Ser. No. 581,452, now Patent No. 3,538,107, dated Nov. 3, 1970. Divided and this application Aug. 5, 1970, Ser. No. 61,405
Claims priority, application Great Britain, Oct. 7, 1965, 42,635/65; Apr. 21, 1966, 17,496/66; June 16, 1966, 26,862/66
Int. Cl. A61k 27/00
U.S. Cl. 424—270
4 Claims

ABSTRACT OF THE DISCLOSURE

Substituted α-(phenyl-thiazolyl) acetic acid derivatives and α-(chlorobenzyl-thiazolyl) acetic acid derivatives, processes for preparing these compounds, and pharmaceutical compositions containing the same. The compounds exhibit anti-inflammatory, analgesic and antipyretic activity, and they reduce the concentration of fibrinogen, cholesterol and/or triglycerides in blood.

---

This is a division of our co-pending application, Ser. No. 581,452, filed Sept. 23, 1966, and now issued as U.S. Pat. 3,538,107.

This invention relates to pharmaceutical compositions and more particularly it relates to pharmaceutical compositions containing thiazole derivatives which have antiinflammatory, analgesic and antipyretic activity, and which reduce the concentration of fibrinogen, and of cholesterol and/or triglycerides, in blood and they may therefore be useful in the treatment or prophylaxis of coronary artery disease and atherosclerosis.

Some thiazole acetic acid derivatives having an aryl or aralkyl substituent on the thiazole ring are known compounds, but it was not known heretofore that compounds of this type have the above-mentioned activities.

According to the invention we provide pharmaceutical compositions comprising one or more thiazole derivatives of the formula:

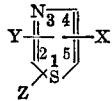

wherein Y or Z is in the 2-position of the thiazole nucleus, and X stands for hydrogen or an alkyl radical, and Y stands for a phenyl or aralkyl radical, either of which may optionally be substituted in the aryl ring with one or two halogen atoms, or either may be substituted with a nitro or trifluoromethyl radical in the p-position of the aryl ring, and Z stands for a group of the formula —$CR^1R^2R^3$, wherein $R^1$ and $R^2$, which may be the same or different, stand for hydrogen or alkyl radicals, and $R^3$ stands for a radical of the formula —CN, —$CO_2R^4$ or —$CONHR^5$, wherein $R^4$ stands for hydrogen or an alkyl, hydroxyalkyl, dialkylaminoalkyl, aralkyl or aryl radical, and $R^5$ stands for hydrogen or a hydroxy, amino, dialkylaminoalkyl, alkoxycarbonylalkyl or carboxyalkyl radical, or a salt thereof, and a pharmaceutically-acceptable diluent or carrier.

It is to be understood that, in all the thiazole derivatives which are the active ingredients of the pharmaceutical compositions of this invention, and in all the new thiazole derivatives described hereinafter, the 2-position of the thiazole nucleus bears either the substituent represented by Y or the substituent represented by Z. When the 2-position bears Y, then the 4-position bears X or Z, and the 5-position bears Z or X, respectively. Alternatively, when the 2-position bears Z, then the 4-position bears X or Y, and the 5-position bears Y or X, respectively.

As a suitable value for X when it stands for an alkyl radical there may be mentioned, for example, an alkyl radical of not more than 3 carbon atoms, for example the methyl radical.

As a suitable value for Y when it stands for an aralkyl radical there may be mentioned, for example, a phenylalkyl radical of not more than 9 carbon atoms, for example the benzyl radical. The halogen substituent or substituents which may optionally be present in the group represented by Y may be selected from fluorine, chlorine and bromine atoms.

As a suitable value for $R^1$ or $R^2$ when it stands for an alkyl radical there may be mentioned, for example, an alkyl radical of not more than 4 carbon atoms, for example the methyl, ethyl or isopropyl radical.

As a suitable value for $R^4$ when it stands for an alkyl or hydroxyalkyl radical there may be mentioned, for example, an alkyl or hydroxyalkyl radical of not more than 5 carbon atoms, for example the methyl, ethyl, n-butyl or 2-hydroxyethyl radical. As a suitable value for $R^4$ when it stands for a dialkylaminoalkyl radical there may be mentioned, for example, a dialkylaminoalkyl radical of not more than 8 carbon atoms, for example the 2-diethylaminoethyl radical. As a suitable value for $R^4$ when it stands for an aralkyl or aryl radical there may be mentioned, for example, a phenylalkyl radical of not more than 9 carbon atoms, for example the benzyl radical, or the phenyl radical.

As a suitable value for $R^5$ when it stands for a dialkylaminoalkyl radical there may be mentioned, for example, a dialkylaminoalkyl radical of not more than 8 carbon atoms, for example the 2-diethylaminoethyl radical. As a suitable value for $R^5$ when it stands for an alkoxycarbonylalkyl radical there may be mentioned, for example, an alkoxycarbonylalkyl radical of not more than 5 carbon atoms, for example the methoxycarbonylmethyl radical. As a suitable value for $R^5$ when it stands for a carboxyalkyl radical there may be mentioned, for example a carboxyalkylradical of not more than 3 carbon atoms, for example the carboxymethyl radical.

As suitable salts in the case where the substituent Z stands for a nitrile, ester or amide group there may be mentioned pharmaceutically-acceptable acid-addition salts, for example a hydrochloride, hydrobromide, sulphate or phosphate. In the case where the substituent Z contains the carboxy radical, suitable salts are salts with alkali metals or alkaline earth metals, for example sodium or calcium salts, or salts with pharmaceutically-acceptable organic bases.

Preferred active ingredients for use in the pharmaceutical compositions of this invention are 2-(4-chlorophenyl)thiazol-4-ylacetic acid,
α-[2-(4-chlorophenyl)thiazol-4-yl]propionic acid,
2-(4-trifluoromethylphenyl)thiazol-4-ylacetic acid,
sodium and calcium α-[4-(4-bromophenyl)thiazol-2-yl] propionate,
methyl α-[4-(4-bromophenyl)thiazol-2-yl]propionate and
methyl α-[4-(4-chlorophenyl)thiazol-2-yl]propionate, and the first of these compounds is particularly preferred.

The pharmaceutical compositions of the invention may be in the form suitable for oral administration, for example tablets, pills, capsules, solutions or suspensions, or in a form suitable for parenteral administration, for example sterile injectable solutions or suspensions, or in a form suitable for topical administration, for example creams, lotions or ointments. The compositions contain conventional pharmaceutical excipients, and they may be manufactured by conventional techniques. The compositions may also contain one or more known agents having anti-inflammatory and/or analgesic activity, for example acetylsalicylic acid, phenylbutazone, chloroquine, codeine or paracetomol.

The tablet compositions contain the active ingredient in admixture with non-toxic pharmaceutical excipients known to be suitable in the manufacture of tablets. Suitable pharmaceutical excipients are, for example, inert diluents, for example calcium carbonate, sodium carbonate, lactose, calcium phosphate or sodium phosphate, granulating and disintegrating agents, for example maize starch or alginic acid, binding agents, for example starch, gelatine or acacia, and lubricating agents, for example magnesium stearate, stearic acid or talc. The tablets may be uncoated or they may be coated by known techniques so as to delay disintegration and absorption in the gastro-intestinal tract and thereby provide a sustained action over a longer period.

The aqueous suspensions of the invention contain the active ingredient in admixture with one or more non-toxic pharmaceutical excipients known to be suitable in the manufacture of aqueous suspensions. Suitable excipients are, for example, suspending agents, for example sodium carboxymethylcellulose, methylcellulose, hydroxypropylmethylcellulose, sodium alginate, polyvinylpyrrolidone, gum tragacanth and gum acacia. Suitable dispersing or wetting agents are naturally-occurring phosphatides, for example lecithin, or condensation products of ethylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The aqueous suspensions may also contain one or more preservatives, for example ethyl or n-propyl p-hydroxybenzoate, one or more colouring agents, one or more flavouring agents and one or more sweetening agents, for example sucrose, saccharin or sodium cyclamate.

Non-aqueous suspensions may be formulated by suspending the active ingredient in a vegetable oil, for example arachis oil, olive, oil, sesame oil or coconut oil, or in a mineral oil, for example liquid paraffin, and the suspensions may contain a thickening agent, for example beeswax, hard paraffin or cetyl alcohol. Sweetening agents, for example icing sugar, sodium saccharin or sodium cyclamate, and flavouring agents, for example caramel, may be added to provide a palatable oral preparation. These compositions may also contain an anti-oxidant, for example propyl gallate or ascorbic acid.

The pharmaceutical compositions of the invention may also be in the form of oil-in-water emulsions. The oily phase may be a vegetable oil, for example olive oil or arachis oil, or a mineral oil, for example liquid paraffin, or mixtures of these. Suitable emulsifying agents are naturally-occurring gums, for example gum acacia or gum tragacanth, naturally-occurring phosphatides, for example soya bean lecithin and fatty acids, for example stearic acid, and esters or partial esters derived from fatty acids and hexitol anhydrides, for example sorbitan mono-oleate, and condensation products of the said partial esters with ethylene oxide, for example polyoxyethylene sorbitan mono-oleate. Ointments may be formulated by suspending the active ingredient in a mixture of liquid paraffin and soft paraffin.

According to a further feature of the invention we provide thiazole derivatives of the formula:

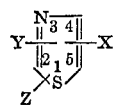

wherein Y or Z is in the 2-position of the thiazole nucleus, and X stands for hydrogen or an alkyl radical, and Y stands for a phenyl or aralkyl radical which bears one or two halogen substituents in the aryl ring, or Y stands for a phenyl or aralkyl radical which bears a nitro or trifluoromethyl substituent in the p-position of the aryl ring, and Z stands for a group of the formula $-CR^1R^2R^3$, wherein $R^1$ and $R^2$, which may be the same or different, stand for hydrogen or alkyl radicals, and $R^3$ stands for a radical of the formula $-CN$, $-CO_2R^4$ or $-CONHR^5$, wherein $R^4$ stands for hydrogen or an alkyl, hydroxyalkyl, dialkylaminoalkyl, aralkyl or aryl radical, and $R^5$ stands for hydrogen or a hydroxy, amino, dialkylaminoalkyl, alkoxycarbonylalkyl or carboxyalkyl radical, and the salts thereof.

As a suitable value for X when it stands for an alkyl radical there may be mentioned, for example, an alkyl radical of not more than 3 carbon atoms, for example the methyl radical.

As a suitable value for Y when it stands for an aralkyl radical there may be mentioned, for example, a phenylalkyl radical of not more than 9 carbon atoms, for example the benzyl radical, which is substituted as indicated above. The halogen substituent or substituents which may be present in the group represented by Y may be selected from fluorine, chlorine and bromine atoms.

As a suitable value for $R^1$ or $R^2$ when it stands for an alkyl radical there may be mentioned, for example, an alkyl radical of not more than 4 carbon atoms, for example the methyl, ethyl or isopropyl radical.

As a suitable value for $R^4$ when it stands for an alkyl or hydroxyalkyl radical there may be mentioned, for example, an alkyl or hydroxyalkyl radical of not more than 5 carbon atoms, for example the methyl, ethyl, n-butyl or 2-hydroxyethyl radical. As a suitable value for $R^4$ when it stands for a dialkylaminoalkyl radical there may be mentioned, for example, a dialkylaminoalkyl radical of not more than 8 carbon atoms, for example the 2-diethylaminoethyl radical. As a suitable value for $R^4$ when it stands for an aralkyl or aryl radical there may be mentioned, for example a phenylalkyl radical of not more than 9 carbon atoms, for example the benzyl radical, or the phenyl radical.

As a suitable value for $R^5$ when it stands for a dialkylaminoalkyl radical there may be mentioned, for example, a dialkylaminoalkyl radical of not more than 8 carbon atoms, for example the 2-diethylaminoethyl radical. As a suitable value for $R^5$ when it stands for an alkoxycarbonylalkyl radical there may be mentioned, for example, an alkoxycarbonylalkyl radical of not more than 5 carbon atoms, for example the methoxycarbonylmethyl radical. As a suitable value for $R^5$ when it stands for a carboxyalkyl radical there may be mentioned, for example a carboxyalkyl radical of not more than 3 carbon atoms, for example the carboxymethyl radical.

As suitable salts in the case where the substituent Z stands for a nitrile, ester or amide group there may be mentioned pharmaceutically-acceptable acid-addition salts, for example a hydrochloride, hydrobromide, sulphate or phosphate. In the case where the substituent Z contains the carboxy radical, suitable salts are salts with alkali metals or alkaline earth metals, for example sodium or calcium salts, or salts with pharmaceutically-acceptable organic bases.

Preferred thiazole derivatives of this invention are 2-(4-chlorophenyl)thiazol-4-ylacetic acid,
α-[2-(4-chlorophenyl)thiazol-4-yl]propionic acid,
2-(4-trifluoromethylphenyl)thiazol-4-ylacetic acid,
sodium and calcium α-[4-(4-bromophenyl)thiazol-2-yl] propionate,
methyl α-[4-(4-bromophenyl)thiazol-2-yl]propionate and
methyl α-[4-(4-chlorophenyl)thiazol-2-yl]propionate, and the first of these compounds is particularly preferred.

According to a further feature of the invention we provide a process for the manufacture of thiazole derivatives of the formula:

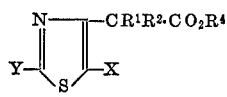

wherein X, Y, $R^1$, $R^2$ and $R^4$ have the meanings stated above, provided that $R^4$ cannot stand for hydrogen, and the salts thereof, which comprises the interaction of a compound of the formula $Y.CS.NH_2$, wherein Y has the meaning stated above, with a compound of the formula:

$$Hal.CHX.CO.CR^1R^2.CO_2R^4$$

wherein X, $R^1$, $R^2$ and $R^4$ have the meanings stated above provided that $R^4$ cannot stand for hydrogen, and Hal stands for a halogen atom.

As a suitable value for Hal there may be mentioned, for example, a chlorine, bromine or iodine atom. The interaction may be carried out in a diluent or solvent, for example ethanol, and it may be accelerated or completed by the application of heat.

According to a further feature of the invention we provide a process for the manufacture of thiazole derivatives of the formula:

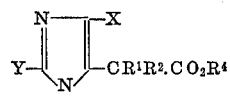

wherein X, Y, $R^1$, $R^2$ and $R^4$ have the meanings stated above, provided that $R^4$ cannot stand for hydrogen, and the salts thereof, which comprises the interaction of a compound of the formula $Y.CS.NH_2$, wherein Y has the meaning stated above, with a compound of the formula:

$$X.CO.CH(Hal).CR^1R^2.CO_2R^4$$

wherein X, Hal, $R^1$, $R^2$ and $R^4$ have the meanings stated above provided that $R^4$ cannot stand for hydrogen.

The interaction may be carried out in a diluent or solvent, for example ethanol, and it may be accelerated or completed by the application of heat.

According to a further feature of the invention we provide a process for the manufacture of thiazole derivatives of the formula:

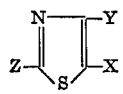

wherein X, Y and Z have the meanings stated above, and the salts thereof, which comprises the interaction of a compound of the formula $Z.CS.NH_2$, wherein Z has the meaning stated above, with a compound of the formula $Hal.CHX.CO.Y$, wherein X, Y and Hal have the meanings stated above.

The interaction may be carried out in a diluent or solvent, for example ethanol, and it may be accelerated or completed by the application of heat.

According to a further feature of the invention we provide a process for the manufacture of thiazole derivatives of the formula:

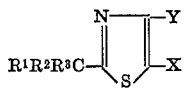

wherein X, Y, $R^1$ and $R^2$ have the meanings stated above, and $R^3$ stands for the cyano or carbamoyl radical, or for an alkoxycarbonyl, aralkoxycarbonyl or aryloxycarbonyl radical and the salts thereof, which comprises the interaction of a compound of the formula $R^1R^2R^3C.CN$ wherein $R^1$, $R^2$ and $R^3$ have the meanings stated above, with a compound of the formula $HS.CHX.CO.Y$, wherein X and Y have the meanings stated above.

The interaction is preferably carried out in the presence of a base, for example diethylamine. It may conveniently be carried out in a diluent or solvent, for example ethanol.

According to a further feature of the invention we provide a process for the manufacture of thiazole derivatives of the formula:

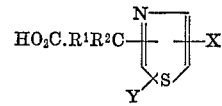

wherein Y or the $-CR^1R^2CO_2H$ group is in the 2-position of the thiazole nucleus, and X, Y, $R^1$ and $R^2$ have the meanings stated above, and the salts thereof, which comprises the hydrolysis of a thiazole derivative of the formula:

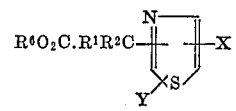

wherein Y or the $-CR^1R^2CO_2R^6$ group is in the 2-position of the thiazole nucleus, and X, Y, $R^1$ and $R^2$ have the meanings stated above and $R^6$ stands for an alkyl, aralkyl or aryl radical.

As a suitable value for $R^6$ there may be mentioned, for example, an alkyl radical of not more than 5 carbon atoms, for example the methyl, ethyl or n-butyl ester, or a phenylalkyl radical of not more than 9 carbon atoms, for example the benzyl radical, or the phenyl radical. As a suitable hydrolytic agent there may be mentioned, for example, a base, for example an alkali metal hydroxide, for example potassium hydroxide. The hydrolysis may be carried out in a solvent, for example water or ethanol, and it may be accelerated or completed by the application of heat.

According to a further feature of the invention we provide a process for the manufacture of thiazole derivatives of the formula:

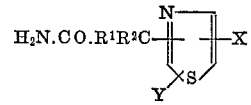

wherein Y or the $-CR^1R^2CONH_2$ group is in the 2-position of the thiazole nucleus, and X, Y, $R^1$ and $R^2$ have the meanings stated above, and the salts thereof, which comprises the hydrolysis of a thiazole derivative of the formula:

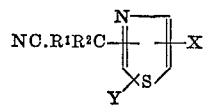

wherein Y or the $-CR^1R^2CN$ group is in the 2-position of the thiazole nucleus, and X, Y, $R^1$ and $R^2$ have the meanings stated above.

As a suitable hydrolytic agent there may be mentioned, for example, an acid, for example an inorganic acid, for example sulphuric acid. The hydrolysis may be accelerated or completed by the application of heat.

According to a further feature of the invention we provide a process for the manufacture of thiazole derivatives of the formula:

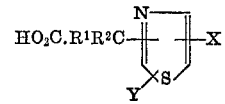

wherein Y or the $-CR^1R^2CO_2H$ group is in the 2-position of the thiazole nucleus, and X, Y, $R^1$ and $R^2$ have the meanings stated above, and the salts thereof, which comprises the hydrolysis of a thiazole derivative of the formula:

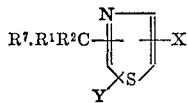

wherein Y or the —CR¹R².R⁷ group is in the 2-position of the thiazole nucleus, and X, Y, R¹ and R² have the meanings stated above and R⁷ stands for the cyano (CN) or carbamoyl (CONH₂) radical.

As a suitable hydrolytic agent there may be mentioned, for example, a base, for example an alkali metal hydroxide, for example potassium hydroxide, or an acid, for example an inorganic acid, for example hydrochloric acid. The hydrolysis may be carried out in a solvent, for example water or ethanol, and it may be accelerated or completed by the application of heat.

According to a further feature of the invention we provide a process for the manufacture of thiazole derivatives of the formula:

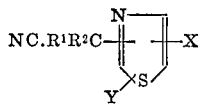

wherein Y or the —CR¹R².CN group is in the 2-position of the thiazole nucleus, and X, Y, R¹ and R² have the meanings stated above, and the salts thereof, which comprises the interaction of a cyanide of a metal, for example sodium cyanide, potassium cyanide or cuprous cyanide, with a compound of the formula:

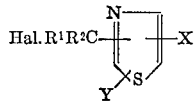

wherein Y or the —CR¹R².Hal group is in the 2-position of the thiazole nucleus, and X, Y, R¹, R² and Hal have the meanings stated above.

The interaction may be carried out in a diluent or solvent, for example ethanol, benzyl cyanide or dimethylsulphoxide, and it may be accelerated or completed by the application of heat.

According to a further feature of the invention we provide a process for the manufacture of those of the new thiazole derivatives of the invention wherein R¹ stands for hydrogen or an alkyl radical and R² stands for an alkyl radical, which comprises the alkylation of the corresponding compound wherein R¹ stands for hydrogen and R² stands for hydrogen or an alkyl radical.

The alkylation may be carried out, for example, by the interaction of an alkali metal derivative, for example the sodium derivative, of the appropriate thiazole derivative with an alkyl halide, for example methyl iodide.

According to a further feature of the invention we provide a process for the manufacture of thiazole derivatives of the formula:

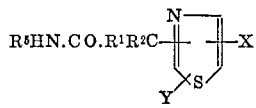

wherein Y or the —CR¹R².CONHR⁵ group is in the 2-position of the thiazole nucleus, and wherein X, Y, R¹ and R² have the meanings stated above and R⁵ stands for the hydroxy or amino radical or for a dialkylaminoalkyl radical, and the salts thereof, which comprises the interaction of a compound of the formula:

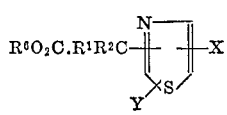

wherein Y or the —CR¹R².CO₂R⁶ group is in the 2-position of the thiazole nucleus, and X, Y, R¹ and R² have the meanings stated above and R⁶ stands for an alkyl radical of not more than 4 carbon atoms or for the phenyl or benzyl radical.

The interaction may be carried out in a diluent or solvent, for example methanol.

According to a further feature of the invention we provide a process for the manufacture of thiazole derivatives of the formula:

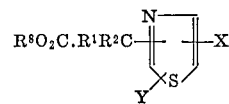

wherein Y or the —CR¹R².CO₂R⁸ group is in the 2-position of the thiazole nucleus, and X, Y, R¹ and R² have the meanings stated above, and R⁸ stands for an alkyl, hydroxyalkyl, dialkylaminoalkyl, aralkyl or aryl radical, and the salts thereof, which comprises the esterification of a thiazole derivative of the formula:

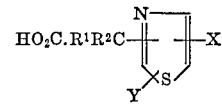

wherein Y or the —CR¹R².CO₂H group is in the 2-position of the thiazole nucleus, and X, Y, R¹ and R² have the meanings stated above, with a hydroxy compound of the formula R⁸OH, wherein R⁸ has the meaning stated above.

Suitable values for R⁸ are the appropriate values mentioned above in respect of R⁴.

The esterification can be carried out by conventional means, for example in the presence of an inorganic acid, for example hydrochloric acid, or of dicyclohexylcarbodiimide. In the case where R⁸ stands for a hydroxyalkyl radical the reactant of the formula R⁸OH may be replaced by the corresponding carbonate. The reaction may be accelerated or completed by the application of heat, and it may optionally be carried out in a diluent or solvent, for example chloroform.

According to a further feature of the invention we provide a process for the manufacture of those of the thiazole derivatives of the invention that are of the formula:

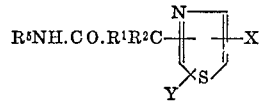

wherein Y or the —CR¹R².CONHR⁵ group is in the 2-position of the thiazole nucleus, and X, Y, R¹ and R² have the meanings stated above and R⁵ stands for an alkoxycarbonylalkyl or dialkylaminoalkyl radical, and the salts thereof, which comprises the interaction of a compound of the formula:

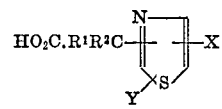

wherein Y or the —CR¹R².CO₂H group is in the 2-position of the thiazole nucleus, and X, Y, R¹ and R² have the meanings stated above, with an amine of the formula R⁵.NH₂, wherein R⁵ has the meaning stated above, in the presence of dicyclohexylcarbodiimide.

Suitable values for R⁵ are mentioned hereinbefore. The interaction may be carried out in a diluent or solvent, for example dry chloroform. The products wherein R⁵ stands for an alkoxycarbonylalkyl radical may be converted by hydrolysis into the corresponding compounds wherein R⁵ stands for a carboxyalkyl radical, and the salts thereof.

As a suitable hydrolytic agent there may be mentioned a base, for example an alkali metal hydroxide, for example sodium hydroxide.

According to a further feature of the invention we provide a process for the manufacture of those of the thiazole derivatives of the invention that are of the formula:

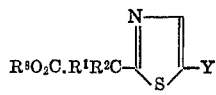

wherein Y, $R^1$, $R^2$ and $R^3$ have the meanings stated above, and the salts thereof, which comprises the interaction of a compound of the formula Y.CHHal.CHO, wherein Y and Hal have the meanings stated above, and a compound of the formula $R^3O_2C.CR^1R^2.CSNH_2$, wherein $R^1$, $R^2$ and $R^3$ have the meanings stated above.

The interaction may be carried out in a diluent or solvent, for example ethanol, and it may be accelerated or completed by the application of heat.

According to a further feature of the invention we provide a process for the manufacture of those of the thiazole derivatives of the invention that are of the formula:

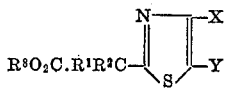

wherein X, Y, $R^1$, $R^2$ and $R^3$ have the meanings stated above, and the salts thereof, which comprises the interaction of a compound of the formula $$R^3O_2C.CR^1R^2.CSNH_2$$

wherein $R^1$, $R^2$ and $R^3$ have the meanings stated above, and a compound of the formula Y.CHHal.COX wherein X, Y and Hal have the meanings stated above.

The interaction may be carried out in a diluent or solvent, for example ethanol, and it may be accelerated or completed by the application of heat.

According to a further feature of the invention we provide the following new compounds: ethyl 4-phenylthiazol-2-ylacetate and ethyl 2-phenylthiazol-4-ylacetate, and the pharmaceutically-acceptable acid-addition salts thereof. These compounds may be obtained as described in the examples hereinafter, or by analogous means.

The invention is illustrated by but not limited by the following examples in which the parts are by weight:

EXAMPLE 1

A mixture containing 25.5 parts of ethyl thiocarbamoylacetate, 48.5 parts of 4-bromophenacyl bromide and 120 parts of ethanol is boiled under reflux for 45 minutes. The ethanol is then removed by distillation under reduced pressure, and the residue is adjusted to pH 10 with aqueous potassium hydroxide. The suspension is extracted with ether, and the ethereal solution is washed with water, and dried over anhydrous sodium sulphate. The ether is evaporated, and the solid residue is crystallised from cyclohexane. There is thus obtained ethyl 4-(4-bromophenyl)thiazol-2-ylacetate, M.P. 71.5–72.5° C.

In a similar manner the following analogues may be obtained from the appropriate starting materials: ethyl 4-(4-chlorophenyl)thiazol-2-ylacetate, M.P. 69–70° C.; and ethyl 4-(4-nitrophenyl)thiazol-2-ylacetate, M.P. 101–102° C.

EXAMPLE 2

6.5 parts of ethyl 4-(4-bromophenyl)thiazol-2-ylacetate are boiled for 10 minutes together with 40 parts of a 10% solution of potassium hydroxide in water. The clear solution is cooled, and clarified by filtration. The solution is adjusted to pH 4 with dilute hydrochloric acid, the temperature being kept between 15 and 20° C. The resulting precipitate of 4-(4-bromophenyl)-thiazol-2-ylacetic acid is collected by filtration, washed well with water, and dried in vacuo at ambient temperature, over phosphorus pentoxide. It decomposes at 122–123° C.

EXAMPLE 3

A mixture of 2.5 parts of thiocarbamoylacetonitrile, 6.9 parts of 4-bromophenacyl bromide and 16 parts of ethanol is boiled under reflux for 30 minutes. The ethanol is then distilled off under reduced pressure and the residue is adjusted to pH 8 with dilute aqueous potassium hydroxide. The solid in suspension is extracted into methylene dichloride, the extract is washed with water, and then dried over anhydrous sodium sulphate. The solvent is evaporated and the residue is crystallised from ethanol in the presence of decolourising carbon. There is thus obtained 4-(4-bromophenyl)-2-cyanomethylthiazole, M.P. 124–126° C.

EXAMPLE 4

14 parts of 4-(4-bromophenyl)-2-cyanomethylthiazole are dissolved in 70 parts of concentrated sulphuric acid, and the solution is heated at 100° C. for 30 minutes. The dark solution is cooled and poured onto crushed ice, and is then adjusted to pH 8 with aqueous sodium hydroxide.

The solid is collected by filtration, washed with water, and dried. The solid is then crystallised from ethyl acetate (at the same time being treated with decolourising carbon), and there is thus obtained 4-(4-bromophenyl) thiazol-2-ylacetamide, M.P. 168–169° C.

EXAMPLE 5

A solution of 32.5 parts of 4-bromothiobenzamide and 31.5 parts of ethyl γ-bromoacetoacetate in 200 parts of ethanol is boiled under reflux for 2 hours, and clarified by filtration whilst still hot. The ethanol is distilled off and the residue is stirred together with an excess of aqueous sodium bicarbonate and ether. The ethereal layer is separated, dried over anhydrous magnesium sulphate, and evaporated to dryness. There is thus obtained ethyl 2-(4-bromophenyl)thiazol-4-ylacetate, M.P. 44–45° C.

EXAMPLE 6

8.6 parts of (4-chloro)thiobenzamide are dissolved in 40 parts of hot ethanol, and 11.15 parts of ethyl β-bromolevulinate are added dropwise over a period of 10 minutes. The mixture is boiled under reflux for 16 hours, and the ethanol is then distilled off. The residual hydrobromide is stirred together with an excess of aqueous sodium bicarbonate and ether, and the ethereal extract is separated and dried over anhydrous magnesium sulphate. Removal of the ether and crystallisation of the residue from cyclohexane gives ethyl 2-(4-chlorophenyl)-4-methylthiazol-5-ylacetate, M.P. 57° C. [crystallised from petroleum ether (B.P. 40–60° C.)].

EXAMPLE 7

5.6 parts of ethyl O-bromolevulinate are added slowly to a solution of 4.6 parts of (4-chlorophenyl)thioacetamide in 40 parts of boiling ethanol. The mixture is boiled under reflux for 16 hours, and the solvent is then evaporated to give an oily residue, which is mixed with 40 parts of acetone, the mixture being filtered to remove traces of solid. The acetone is evaporated from the filtrate, and an excess of a solution of hydrogen chloride in ether is added to the oily residue. The ether is decanted from the solid hydrochloride thus obtained, and the solid is treated with a mixture of ether and dilute aqueous sodium bicarbonate in an amount sufficient to give an alkaline medium. The ethereal layer is separated, dried over anhydrous magnesium sulphate, and the solvent evaporated. The residual oil is dissolved in 15 parts of methanol containing sufficient aqueous 40% sodium hydroxide to give a pH of 10, and the solution is boiled under reflux for 10 minutes. The mixture is diluted with 100 parts of water and acidified by the addition of acetic acid. The mixture is filtered, the solid residue is washed thoroughly with water, and is then shaken together with aqueous sodium bicarbonate solution. The mixture is filtered, and the filtrate is acidified with acetic acid. There is thus obtained 2-(4-chlorobenzyl)-4-methylthiazol-5-ylacetic acid, M.P. 197° C.

EXAMPLE 8

7.2 parts of diethylamine are added to a stirred suspension of 11.55 parts of 4-bromo-ω-mercaptoacetophenone in 5.65 parts of ethyl cyanoacetate and 25 parts of ethanol. After 45 minutes the solid product is collected by filtration, and the filtrate is diluted with 60 parts of water to precipitate a second batch of solid product. The combined solids are dried and are then thoroughly stirred together with 70 parts of ethyl acetate. The mixture is filtered, and ethanolic hydrogen chloride is added to the filtrate until precipitation is complete. The mixture is filtered, and the solid residue is shaken together with an excess of dilute aqueous potassium hydroxide solution. The mixture is extracted with ether, and the ethereal extracts are separated and dried. The solvent is evaporated and the residue is crystallised from cyclohexane. There is thus obtained ethyl 4-(4-bromophenyl)-thiazol-2-ylacetate, M.P. 72.5–74° C.

The 4-bromo-ω-mercaptoacetophenone used as starting material may be obtained as follows:

27.8 parts of 4-bromophenacyl bromide, 12.5 parts of potassium thiolacetate and 80 parts of ethanol are boiled under reflux for 10 minutes. The hot mixture is filtered, and the solid which separates in the filtrate on cooling is collected by filtration and crystallised from ethanol. There is thus obtained ω-acetylthio-4-bromoacetophenone, M.P. 70–70.5° C. 1 part of this compound is stirred together with 10 parts of 2 N-aqueous potassium hydroxide under nitrogen for 2 hours. The mixture is filtered, and the filtrate is acidified with dilute hydrochloric acid. The mixture is filtered and the solid residue is crystallised from cyclohexane. There is thus obtained 4-bromo-ω-mercaptoacetophenone, M.P. 84–86° C.

EXAMPLE 9

A suspension of 10 parts of 4-(4-bromophenyl)-2-cyanomethylthiazole in 100 parts of a 20% solution of potassium hydroxide in water is boiled under reflux for 7 hours. The resulting mixture is filtered, and the filtrate is acidified to pH 4 by the addition of hydrochloric acid at a temperature not exceeding 20° C. (4-(4-bromophenyl)thiazol-2-ylacetic acid is precipitated, and is collected by filtration, washed well with water, and dried in vacuo at ambient temperature, over phosphorus pentoxide. It has an infra-red spectrum identical with that of the acid obtained as described in Example 2.

EXAMPLE 10

3.7 parts of 2-(4-chlorophenyl)-4-cyanomethylthiazole and 35 parts of 6 N-hydrochloric acid are heated under reflux for 2 hours. The solution is cooled by the addition of ice and made alkaline to pH 8 by the addition of 30% aqueous ammonia. The mixture is filtered to remove trace impurities, and an excess of 40% sodium hydroxide solution is then added to the filtrate to cause precipitation of a sodium salt, which is collected by filtration and crystallised from water. There is thus obtained sodium 2-(4-chlorophenyl)thiazol-4-ylacetate, M.P. 123° C. (decomposition).

This sodium salt is dissolved in hot water, and the solution is brought to pH 4 by the addition of acetic acid, which causes the precipitation of 2-(4-chlorophenyl)thiazol-4-ylacetic acid. This is collected by filtration, washed with water, and dried in vacuo over phosphorus pentoxide. It has an M.P. of 155–156° C.

The 2-(4-chlorophenyl)-4-cyanomethylthiazole used as starting material may be obtained as described in Example 11.

EXAMPLE 11

10.4 parts of 4-chloromethyl-2-(4-chlorophenyl)thiazole are dissolved in 40 parts of 2-ethoxyethanol and the solution is added to a stirred solution of 2.5 parts of sodium cyanide in 2.5 parts of water at 90–100° C. After stirring at 90° C. for 4 hours, the mixture is diluted with an excess of water and then filtered. The solid residue is washed with water and then crystallised from methanol. There is thus obtained 2-(4-chlorophenyl)-4-cyanomethylthiazole, M.P. 116–117° C.

The 4-chloromethyl-2-(4-chlorophenyl)thiazole used as starting material may be obtained as follows:

8.5 parts of 1-chloro-3-(α-imino-4-chlorobenzylthio)-acetone hydrochloride, 9 parts of 36% hydrochloric acid and 80 parts of acetone are heated together under reflux for 2 hours. The resultant solution is poured into water and extracted with chloroform. The chloroform extract is washed with water, dried over anhydrous magnesium sulphate, and filtered. The filtrate is evaporated to dryness in vacuo, and the residue is crystallised from cyclohexane. There is thus obtained 4-chloromethyl-2-(4-chlorophenyl)thiazole, M.P. 82–84° C.

1-chloro-3-(α-imino-4-chlorobenzylthio)acetone hydrochloride may be obtained as follows:

A solution of 8.5 parts of p-chlorothiobenzamide in 30 parts of dry acetone is mixed with a solution of 6.5 parts of 1,3-dichloroacetone in 20 parts of acetone. After standing at room temperature for 24 hours, the mixture is filtered and the solid residue is successively washed with acetone and ether. There is thus obtained 1-chloro-3-(α-imino - 4 - chlorobenzylthio)acetone hydrochloride, M.P. 160° C. (decomposition).

EXAMPLE 12

The process described in Example 10 for the preparation of 2-(4-chlorophenyl)thiazol-4-ylacetic acid is repeated except that the thiazole starting material is replaced by the appropriate thiazole derivative, and in a similar manner there are obtained the following compounds:

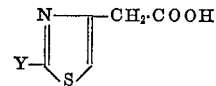

| Y | M.P. (° C.) | Crystallisation solvent(s) |
|---|---|---|
| 4-fluorophenyl | 122–124 | Methanol. |
| 2-chlorophenyl | 109–110 | |
| 3-chlorophenyl | 99–100 | Aqueous ethanol. |
| 4-bromophenyl | 149–150 | |
| 3,4-dichlorophenyl | 145 | Aqueous methanol. |
| 2,4-dichlorophenyl | [1] 116 | Water. |

[1] Dec. (sodium salt).

The cyanomethylthiazole derivatives used as starting materials may be obtained as described in Example 13.

EXAMPLE 13

The process described in Example 11 for the preparation of 2-(4-chlorophenyl)-4-cyanomethylthiazole is repeated except that the appropriate starting materials are used to obtain the following compounds:

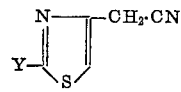

| Y | M.P. (° C.) | Crystallisation solvent(s) |
|---|---|---|
| 4-fluorophenyl | 78–79 | Aqueous methanol. |
| 2-chlorophenyl | 90 | Do. |
| 3-chlorophenyl | [1] 69 | Butanol. |
| 4-bromophenyl | 122 | Methanol. |
| 3,4-dichlorophenyl | 106 | Do. |
| 2,4-dichlorophenyl | 125–126 | Do. |

[1] Hydrochloride.

EXAMPLE 14

4 parts of 2 - (4-chlorophenyl)-4-cyanomethylthiazole are dissolved in 36 part of concentrated sulphuric acid, and the solution is kept at room temperature for 24 hours. The solution is then poured into 200 parts of ice and water, the mixture is filtered, and the solid residue is crystallised from benzene. There is thus obtained 2-(4-chlorophenyl)thiazol-4-ylacetamide, M.P. 171–172° C.

The above process is repeated except that the chlorophenyl derivative used as starting material is replaced by 2-(4-bromophenyl)-4-cyanomethylthiazole. In a similar manner there is obtained 2-(4-bromophenyl)thiazol-4-yl-acetamide, M.P. 184.5° C. (crystallised from methanol).

EXAMPLE 15

17 parts of p-chlorothiobenzamide are dissolved in 50 parts of ethanol, and 21 parts of methyl γ-bromoacetoacetate are added. The mixture is heated under reflux for 3 hours, and the solvent is then evaporated in vacuo. The residue is triturated with ether, and the resulting mixture is filtered. The solid residue is suspended in ether, and an excess of aqueous sodium bicarbonate is added. The ethereal layer is separated from the mixture, and is then washed with water, dried over anhydrous magnesium sulphate, filtered and evaporated to dryness. The residual solid is crystallised from petroleum ether (B.P. 60–80° C.). There is thus obtained methyl 2-(4-chlorophenyl)thiazol-4-ylacetate, M.P. 72° C.

EXAMPLE 16

A mixture of 30 parts of 2-(4-chlorophenyl)thiazol-4-ylacetic acid in 100 parts of dry methanol is saturated with dry hydrogen chloride. The solution is then heated under reflux for 2 hours, and during this time dry hydrogen chloride is continuously bubbled through the solution. The solution is evaporated to dryness and the solid residue is suspended in ether and an excess of 5% aqueous sodium bicarbonate added. The ethereal layer is separated, washed with water, dried over anhydrous magnesium sulphate, and filtered. The filtrate is evaporated to dryness, and as residue there is obtained methyl 2-(4-chlorophenyl)thiazol-4-ylacetate, M.P. 72° C.

In a similar manner, using 100 parts of n-butanol instead of 100 parts of methanol and carrying out the reaction at 90° C., there is obtained n-butyl 2-(4-chlorophenyl)thiazol-4-ylacetate as an oil. To a solution of this compound in n-butanol there is added ethereal hydrogen chloride. The resulting mixture is filtered and the solid residue is crystallised from n-butanol. There is thus obtained n-butyl 2-(4-chlorophenyl)thiazol-4-ylacetate hydrochloride, M.P. 186° C. (decomposition).

EXAMPLE 17

18.6 parts of (p-chlorophenyl)thioacetamide are dissolved in 150 parts of ethanol, and 21 parts of ethyl γ-bromoacetoacetate are added. The mixture is heated under reflux for 2 hours, and is then evaporated to dryness in vacuo. The residual semi-solid is stirred with a mixture of ether and an excess of 5% aqueous sodium bicarbonate. The ethereal layer is separated from the mixture, washed well with water, and dried over anhydrous magnesium sulphate. After filtering, ethereal hydrogen chloride is added to the filtrate, and the resulting mixture is filtered. The solid residue is crystallised from ethyl acetate, and there is obtained ethyl 2-(4-chlorobenzyl)thiazol-4-ylacetate hydrochloride, M.P. 139–141° C.

3 parts of this ester hydrochloride are refluxed with 30 parts of N-aqueous sodium hydroxide for 30 minutes and the mixture is then acidified to pH 4 with acetic acid. The precipitate is collected by filtration, washed with water, dried, and crystallised from 1:1 mixture of carbon tetrachloride and petroleum ether (B.P. 60–80° C.). There is thus obtained 2-(4-chlorobenzyl)thiazol-4-ylacetic acid, M.P. 114–116° C.

EXAMPLE 18

A solution of 28 parts of ethyl 2-(4-chlorophenyl)-thiazol-4-ylacetate in 30 parts of dry ether is added to a solution of 3.9 parts of sodamide in 80 parts of liquid ammonia. The mixture is stirred at −70° C. for 30 minutes, and 14 parts of methyl iodide are then added and the mixture is stirred at −70° C. for 1 hour. 5 parts of ammonium chloride are added, and the ammonia is allowed to evaporate. The residue is stirred with 5% aqueous sodium bicarbonate and ether. The ether layer is separated from the mixture, washed with water, dried over anhydrous magnesium sulphate, filtered and evaporated to dryness. The residual oil is distilled. There is thus obtained ethyl α-[2-(4-chlorophenyl)-thiazol-4-yl]propionate, B.P. 152–153° C./0.4 mm. (132–134° C./0.12 mm.).

3 parts of this ester and 40 parts of 0.5 N-aqeous sodium hydroxide are heated under reflux for 2 hours. The solution is acidified to pH 4 with acetic acid and then filtered. The solid residue is washed with water, dried at 80° C., and crystallised from cyclohexane. There is thus obtained α-[2-(4-chlorophenyl)-thiazol - 4 - yl]propionic acid, M.P. 96–97° C.

EXAMPLE 19

17.1 parts of p-chlorothiobenzamide are dissolved in 120 parts of ethanol and 22 parts of ethyl β-bromolaevulinate are added. The mixture is heated under reflux for 16 hours, and then evaporated to dryness in vacuo. 10 parts of the residue are dissolved in 50 parts of methanol, and 10 N-aqueous sodium hydroxide is added to pH 11. The mixture is boiled for 20 minutes, and then poured into water. The resulting mixture is filtered, and the filtrate is acidified with acetic acid to pH 4 and the resultant product collected by filtration. It is purified by extraction into cold 5% aqueous ammonium hydroxide, carbon treatment of the solution, and re-precipitation with acetic acid at pH 4. The product is collected by filtration, and there is thus obtained 2-(4-chlorophenyl)-4-methyl-thiazol-5-ylacetic acid, M.P. 172–175° C. (decomposition).

EXAMPLE 20

8.35 parts of 4-bromophenacyl bromide are added to a solution of 4.2 parts of methyl thiocarbamoylacetate in 30 parts of methanol preheated to 50° C. The mixture is heated under reflux for 45 minutes, and the methanol is then removed by distillation under reduced pressure. The residual solid is agitated together with warm ethyl acetate, and the mixture filtered. The residual solid is washed well with warm ethyl acetate and is then shaken with a mixture of ether and sufficient aqueous potassium hydroxide to give a pH of 10. The ethereal layer is separated from the mixture and the aqueous layer is extracted two further times with ether. The combined ethereal extracts are washed with water, and dried over anhydrous sodium sulphate. The ether is evaporated, and the residue is crystallised from methanol to give methyl 4-(4-bromophenyl)thiazol-2-ylacetate, M.P. 87–88° C.

By following a similar procedure, but starting with 4-fluorophenacyl bromide and ethyl thiocarbamoylacetate in ethanol, there is obtained ethyl 4-(4-fluorophenyl)thiazol-2-ylacetate, M.P. 57.5–59° C. [crystallised from petroleum ether (B.P. 60–80° C.)].

EXAMPLE 21

13 parts of 4-fluorophenacyl bromide are added slowly to a solution of 9.7 parts of ethyl thiocarbamoylacetate in 16 parts of ethanol at 60° C. The solution is heated under reflux for 45 minutes, and the ethanol is then removed by distillation under reduced pressure. The solid residue is triturated with warm ethyl acetate, and the resulting mixture is filtered and the solid residue washed with warm ethyl acetate. The solid is heated under reflux for 1 hour with 70 parts of aqueous 2 N-potassium hydroxide, and the mixture is then cooled and washed twice with 50 parts of ether. The aqueous solution is decolourised with carbon, filtered, and brought to pH 3 by the addition of 20% hydrochloric acid. The resulting precipitate is collected by filtration, washed well with water, and is then dissolved in a dilute solution of ammonia in water. The solution is adjusted to pH 3 by the addition of dilute hydrochloric acid, and the solid which is precipitated is collected by filtration, washed with water, and dried in vacuo over phosphorus pentoxide at ambient temperature. There is thus obtained 4-(4-fluorophenyl) thiazol-2-ylacetic acid, M.P. 120° C. (decomposition).

By using 4-chlorophenacyl bromide instead of 4-fluorophenacyl bromide, in a similar manner there is obtained 4-(4-chlorophenyl)thiazol-2-ylacetic acid, M.P. 118° C. (decomposition).

EXAMPLE 22

8.35 parts of 4-bromophenacyl bromide are added slowly to a solution of 4.85 parts of ethyl α-thiocarbamoylpropionate in 20 parts of ethanol at 50° C. The mixture is heated under reflux for 1.25 hours, and the ethanol is then removed under reduced pressure. The residue is triturated with warm ethyl acetate and the resulting mixture is filtered. The solid residue is washed with warm ethyl acetate. The solid is added to a 2 N-solution of potassium hydroxide in 50 parts of 90% ethanol, and the mixture is stirred and heated under reflux for 1 hour. The ethanol is removed by distillation under reduced pressure and 50 parts of water are added. The solution is washed twice with ether, decolourised with carbon, filtered, and adjusted to pH 3 by addition of dilute hydrochloric acid. The precipitate thus obtained is gummy, but hardens as the suspension is stirred for 30 minutes. The solid is collected by filtration, washed well with water, and is then mixed with 20 parts of a 4% solution of ammonia in water. Kieselguhr is added to the mixture, and the resulting mixture is filtered. Dilute hydrochloric acid is added to the filtrate to give a pH of 3, and the resultant suspension is stirred for 30 minutes. The mixture is filtered, and the solid residue is washed well with water, and then dried in vacuo over phosphorus pentoxide at ambient temperature. There is thus obtained α-[4-(4-bromophenyl)thiazol-2-yl]propionic acid, M.P. 110° C. (decomposition).

By similar procedures, the following acids are prepared from the appropriate starting materials: α-[4-(4-chlorophenyl)thiazol-2-yl]propionic acid, M.P. 94–95° C. (decomposition), α - [4 - (4-bromophenyl)thiazol-2-yl]isovaleric acid, M.P. 110–111° C. (decomposition).

The thioamides used as starting materials in the preparation of the last-named two compounds may be obtained from the corresponding nitriles as follows:

Ethyl α-thiocarbamoylpropionate may be obtained as follows:

98.8 parts of ethyl α-cyanopropionate are added to 650 parts of ethanol in which 2.5 parts of potassium have been dissolved. The solution is cooled to —10° C., and saturated with hydrogen sulphide at this temperature. It is warmed gradually to 65° C., and is kept at this temperature for 2 hours. This process of saturation at —10° C., followed by heating at 65° C. for 2 hours is carried out four times in all. The mixture is then cooled and adjusted to pH 5 by the addition of ethanolic hydrogen chloride. The mixture is filtered, and the ethanol is evaporated under reduced pressure from the filtrate. The residual oil is heated at 85° C. under a pressure of 1 mm. to remove unchanged ethyl α-cyanopropionate, and the residue is washed with cold carbon tetrachloride. The solid is then crystallised from carbon tetrachloride, and there is obtained ethyl α-thiocarbamoylpropionate, M.P. 68–69° C.

Ethyl α-thiocarbamoylisovalerate is prepared similarly from the corresponding nitrile. It is crystallised from cyclohexane, and has M.P. 84–85° C.

EXAMPLE 23

A mixture of 11.7 parts of 4-chlorophenacyl bromide, 5 parts of thiocarbamoylacetonitrile and 50 parts of ethanol is heated under reflux for 5 hours. Most of the ethanol is then removed by distillation under reduced pressure, and the semi-solid residue is triturated with 50 parts of ethyl acetate. The insoluble material is collected by filtration, mixed with sufficient dilute aqueous potassium hydroxide to give an alkaline medium, and this is extracted with chloroform. The chloroform extract is washed with water, dried over anhydrous sodium sulphate, and the solvent is then evaporated. The residue is crystallised from carbon tetrachloride, and there is obtained 4-)4-chlorophenyl)-2-cyanomethylthiazole, M.P. 121–122° C.

EXAMPLE 24

2.8 parts of hydroxylamine hydrochloride are dissolved in 16 parts of methanol, and the solution is added to a solution of 3.35 parts of potassium hydroxide in 16 parts of methanol. The precipitated potassium chloride is removed by filtration, and the filtrate is added to a solution of 6.4 parts of ethyl 4-(4-bromophenyl)thiazol-2-ylacetate in 96 parts of methanol. After four days, the mixture is filtered and the solid residue is washed with methanol. The solid is crystallised from dioxan, and there is obtained 4-(4-bromophenyl)thiazol-2-ylacethydroxamic acid, M.P. 173–174° C. (decomposition).

EXAMPLE 25

A mixture containing 16.5 parts of ethyl 4-(4-bromophenyl)thiazol-2-ylacetate, 4 parts of hydrazine hydrate and 40 parts of ethanol is heated under reflux for 1 hour. The solution is cooled, and the solid which separates out is collected by filtration. The solid is crystallised from n-propanol to give 4-(4-bromophenyl)thiazol-2-ylacethydrazide, M.P. 173–174° C.

EXAMPLE 26

4.8 parts of triethylamine are added to a suspension of 14.3 parts of 4-(4-bromophenyl)thiazol-2-ylacetic acid in 250 parts of chloroform which has been freed from ethanol by standing in contact with anhydrous calcium chloride. The resultant solution is cooled to —10° C., and 8.6 parts of benzenesulphonyl chloride are added. The mixture is kept at —10° C. for 20 minutes, and 8.5 parts of β-diethylaminoethanol are then added. The mixture is heated under reflux for 3 hours, cooled, and extraced three times with aqueous 2 N-hydrochloric acid. The extracts are combined, the last traces of chloroform are evaporated under reduced pressure, and the pH of the aqueous solution is brought to 10 by addition of sodium hydroxide solution. The precipitate which forms is collected by filtration, washed with water, and redissolved in dilute acetic acid. The liquid is freed from any traces of insoluble material by filtration, and is then brought to pH 10 by addition of sodium hydroxide solution. The solid thus obtained is collected by filtration, washed with water, and dried at ambient temperature in vacuo over phosphorus pentoxide. The solid is dissolved in warm petroleum ether (B.P. 40–60° C.), the solution is cooled to —15° C. and the resulting mixture is filtered at —15° C. There is thus obtained, as solid residue, β-diethylaminoethyl 4 - (4-bromophenyl)thiazol-2-ylacetate, M.P. 46–47.5° C.

EXAMPLE 27

8.3 parts of 4-bromophenacylbromide are added slowly to a solution of 5.25 parts of ethyl α-thiocarbamoylisobutyrate in 20 parts of ethanol at 50° C. The mixture is heated under reflux for 1 hour, and the ethanol is distilled off under reduced pressure. The residual oil is stirred with 100 parts of ethyl acetate at 50° C., and the solid hydrobromide thus obtained is collected by filtration. It is mixed with 30 parts of a 2 N-solution of potassium hydroxide in ethanol, and is stirred under reflux for 20 minutes. The mixture is cooled, diluted with 35 parts of water, and evaporated to about half its volume under reduced pressure. The resultant solution is washed twice with ether, treated with decolourising carbon, and filtered. The filtrate is cooled to 5° C., and brought to pH 3 by the slow addition of aqueous 5 N-hydrochloric acid, the temperature being kept at 5° C. during this process.

The precipitate thus obtained is collected by filtration, washed with water, well drained on the filter, and it is then redissolved in dilute aqueous potassium hydroxide. The turbid solution is clarified by filtration, and is cooled to 5° C. Whilst sufficient dilute hydrochloric acid is added to give a pH of 3. The resultant suspension is stirred for 30 minutes, and the precipitated α-[4-(4-bromophenyl)-thiazol - 2 - yl]isobutyric acid is collected by filtration, washed well with water, and dried in vacuo over phosphorus pentoxide at ambient temperature. The acid decomposes at 97° C.

The ethyl α-thiocarbamoylisobutyrate used in the foregoing preparation may be obtained as follows:

35 parts of ethyl α-cyanoisobutyrate are added to 250 parts of ethanol in which 0.8 part of potassium has been dissolved. The solution is colled to —10° C. and is saturated with hydrogen sulphide at this temperature. It is then warmed slowly to 65° C. and kept at this temperature for 2 hours. This process of saturation with hydrogen sulphide at —10° C. and subsequent heating at 65° C. is carried out four times in all. The mixture is then cooled, and its pH is adjusted to 4 by addition of ethanolic hydrogen chloride. The mixture is filtered, and the ethanol is evaporated from the filtrate under reduced pressure. The residual oil is filtered, and the filtrate is then heated in a distillation apparatus under a pressure of 1 mm. at 80° C. until no further evaporation takes place. The residual oil is triturated with petroleum ether (B.P. 40–60° C.) and the white solid thus formed is collected by filtration, and crystallised from cyclohexane. There is thus obtained ethyl α-thiocarbamoylisobutyrate, M.P. 54–56° C.

EXAMPLE 28

The process described in Example 10 is repeated except that the 2-(4-chlorophenyl)-4-cyanomethylthiazole is replaced by 2-(2,6-dichlorophenyl)-4-cyanomethylthiazole. In a similar manner there is obtained 2-(2,6-dichlorophenyl)thiazol - 4 - ylacetic acid, M.P. 130–131° C.

EXAMPLE 29

The process described in Example 11 is repeated except that the 4-chloromethyl-2-(4-chlorophenyl)thiazole is replaced by 4-chloromethyl-2-(2,6-dichlorophenyl)thiazole. In a similar manner there is obtained 4-cyanomethyl-2-(2,6-dichlorophenyl)thiazole, M.P. 77–78° C. (crystallised from aqueous methanol).

EXAMPLE 30

5 parts of 3,4-dichlorothiabenzamide, 5 parts of ethyl β-bromolaevulinate and 50 parts of ethanol are boiled under reflux for 4 hours. The solution is evaporated to dryness in vacuo and the residual oil washed twice with 100 parts of ether. The solid residue is crystallised from a mixture of n-butanol and ether, and there is obtained ethyl 2-(3,4-dichlorophenyl)-4-methylthiazol-5-ylacetate hydrobromide, M.P. 120–121° C.

The above process is repeated except that the 3,4-dichlorothiabenzamide is replaced by 4-fluorothiabenzamide, and in a similar manner there is obtained ethyl 2-(4-fluorophenyl)-4-methylthiazol - 5 - ylacetate hydrobromide, M.P. 148–151° C.

The above process is repeated except that the 3,4-dichlorothiabenzamide is replaced by 4-trifluoromethylthiobenzamide, and in a similar manner there is obtained 4-methyl-2-(4-trifluoromethylphenyl)thiazol - 5 - ylacetate hydrobromide, M.P. 165° C.

EXAMPLE 31

5.5 parts of ethyl 2-(3,4-dichlorophenyl)-4-methylthiazol-5-ylacetate hydrobromide and 40 parts of N-sodium hydroxide solution are boiled under reflux for 90 minutes. The solution is cooled, decolourising carbon is added, and the mixture is filtered. The filtrate is acidified with glacial acetic acid and the resulting mixture is filtered. The solid residue is dissolved as much as possible in 50 parts of hot 5% w./v. aqueous ammonium hydroxide and the mixture is filtered. The hot filtrate is acidified with glacial acetic acid and then allowed to cool. The crystalline product is collected by filtration, washed with water, and dried. There is thus obtained 2-(3,4-dichlorophenyl)-4-methylthiazol - 5 - ylacetic acid, M.P. 168° C.

In a similar manner, using the corresponding 4-fluorophenyl derivative as starting material, there is obtained 2-(4-fluorophenyl)-4-methylthiazol-5-ylacetic acid, M.P. 134° C.

In a similar manner, using the corresponding 4-trifluoromethylphenyl derivative as starting material, there is obtained 4-methyl-2-(4-trifluoromethylphenyl)thiazol-5-ylacetic acid, M.P. 150° C.

EXAMPLE 32

10.3 parts of 4-chlorothiabenzamide and 7.8 parts of ethyl β-bromo-β-formylpropionate in 40 parts of ethanol are boiled under reflux for 4 hours and then evaporated to dryness in vacuo. The residual gum is stirred with 100 parts of ether, and the ether is then removed by decantation. This step is repeated. To the residue there are added 100 parts of ether and 50 parts of 5% w./v. aqueous sodium bicarbonate. The ether layer is separated, washed twice with 100 parts of water, and then evaporated to dryness in vacuo. The residue is boiled under reflux with 30 parts of N-sodium hydroxide solution for 2 hours, and then cooled. Decolourising carbon is added and the mixture is filtered. The filtrate is acidified with glacial acetic acid, and then extracted five times with 20 parts of chloroform. The chloroform extracts are combined, washed three times with 50 parts of water, dried over anhydrous magnesium sulphate and filtered. The filtrate is evaporated to dryness and the residue is crystallized from cyclohexane. There is thus obtained 2-(4-chlorophenyl)thiazol-5-ylacetic acid, M.P. 153–155° C.

EXAMPLE 33

5.7 parts of 2-(4-chlorophenyl)thiazol-4-ylacetic acid and 3.2 parts of 2-diethylaminoethylamine are dissolved in 50 parts of dry chloroform. The solution is cooled to a temperature not exceeding 10° C. and 5 parts of dicyclohexylcarbodiimide are added. The mixture is stirred for 2½ hours and then filtered. The filtrate is extracted 8 times with 50 parts of N-hydrochloric acid. The acidic extracts are washed with 50 parts of benzene and then basified by the addition of 10 N-sodium hydroxide solution. The mixture is extracted three times with 30 parts of benzene. The combined benzene extracts are washed twice with 100 parts of water, dried over anhydrous magnesium sulphate, and evaporated to dryness in vacuo. The solid residue is crystallised from benzene, and there is thus obtained 2-(4-chlorophenyl)-N-(2-diethylaminoethyl)thiazol-4-ylacetamide, M.P. 74° C.

EXAMPLE 34

5.7 parts of 2-(4-chlorophenyl)thiazol-4-ylacetic acid and 3.1 parts of glycine methyl ester hydrochloride are suspended in 75 parts of dry chloroform, and 3.4 parts of triethylamine are added. The resulting solution is cooled to a temperature not exceeding 10° C., and 5 parts of dicyclohexylcarbodiimide are added. The mixture is stirred at ambient temperature for 16 hours and then filtered. The filtrate is washed three times with 50 parts of 5% w./v. ammonium hydroxide solution, and is then washed twice with 100 parts of water. The solution is dried with anhydrous magnesium sulphate and filtered. 250 parts of dry ether are added to the filtrate, and saturated ethereal hydrogen chloride is then added until precipitation is complete. The mixture is filtered and the solid residue is shaken together with 50 parts of chloroform and 30 parts of 10% w./v. sodium bicarbonate solution. The mixture is separated, and the chloroform solution is washed twice with 100 parts of water and then dried with anhydrous magnesium sulphate. The solution is evaporated to dryness in vacuo, and there is thus obtained methyl α-[2-(4-chlorophenyl)thiazol-4-ylacetamido]acetate, M.P. 135° C.

EXAMPLE 35

1.5 parts of methyl α-[2-(4-chlorophenyl)thiazol-4-ylacetamido]acetate hydrochloride, 15 parts of ethanol, and 20 parts of water are stirred at ambient temperature and made alkaline to pH 11 by the addition of 10 N-sodium hydroxide solution. The mixture is kept at ambient temperature for 16 hours and then filtered. The filtrate is acidified to pH 5 with glacial acetic acid, and the resulting mixture is filtered. The solid residue is suspended in 30 parts of hot 5% w./v. ammonium hydroxide solution, and the mixture is filtered. The hot filtrate is acidified with glacial acetic acid and then cooled. The resulting mixture is filtered and the solid residue is dried. There is then obtained α-[2-(4-chlorophenyl)thiazol-4-ylacetamido]acetic acid, M.P. 225° C.

EXAMPLE 36

10.25 parts of 4 - trifluoromethylthiobenzamide and 10.45 parts of ethyl ω-bromoacetoacetate in 50 parts of ethanol are boiled under reflux for 5 hours. The mixture is evaporated to dryness in vacuo and the residue is washed twice with 150 parts of ether. The residue is shaken with 150 parts of ether and 100 parts of 5% w./v. sodium bicarbonate solution. The mixture is separated and the ether solution is washed twice with 100 parts of water, dried with anhydrous magnesium sulphate, filtered and evaporated to dryness in vacuo. The residue is dissolved in 100 parts of dry ether, and saturated ethereal hydrogen chloride is added until precipitation is complete. The mixture is filtered and the solid residue is dried. There is thus obtained ethyl 2-(4-trifluoromethylphenyl)thiazol-4-ylacetate hydrochloride, M.P. 158–159° C.

EXAMPLE 37

A solution of 5.7 parts of ethyl 2-(4-trifluoromethylphenyl)thiazol-4-ylacetate hydrochloride and 2.6 parts of sodium hydroxide in 75 parts of water is boiled under reflux for 2 hours. The resulting mixture is diluted with 175 parts of water and filtered, and the filtrate is acidified with glacial acetic acid. The mixture is filtered, and the solid residue is suspended in 50 parts of hot 5% w./v. ammonium hydroxide solution. The mixture is filtered whilst hot and the filtrate is acidified with glacial acetic acid. The mixture is cooled and then filtered, and the solid residue is dried. There is thus obtained 2-(4-trifluoromethylphenyl)thiazol-4-ylacetic acid, M.P. 123° C.

EXAMPLE 38

1.25 parts of 2-(4-chlorophenyl)thiazol-4-ylacetic acid and 0.88 part of ethylene carbonate are heated together at 150–160° C. for 10 hours. The mixture is cooled and diluted with 100 parts of 1% w./v. ammonium hydroxide solution. The resulting mixture is filtered, and the solid residue is crystallised from aqueous ethanol. There is thus obtained 2-hydroxyethyl 2-(4-chlorophenyl)-thiazol-4-ylacetate, M.P. 152–154° C.

EXAMPLE 39

2.3 parts of 2-(4-chlorophenyl)thiazol-4-ylacetic acid and 1.3 parts of benzyl alcohol are stirred in 40 parts of dry chloroform, and 2.2 parts of dicyclohexylcarbodiimide are added at a temperature not exceeding 10° C. The mixture is stirred for 2 hours at a temperature not exceeding 10° C. The mixture is then filtered and the filtrate is successively washed three times with 75 parts of 10% w./v. ammonium hydroxide solution and four times with 50 parts of water, and then dried. The solution is evaporated to dryness, and the residue is dissolved as far as possible in 50 parts of ether. The mixture is filtered, the filtrate is evaporated to dryness, and the residue is crystallised from cyclohexane. There is thus obtained benzyl 2 - (4 - chlorophenyl)thiazol - 4 - ylacetate, M.P. 139° C.

The above process is repeated except that the 1.3 parts of benzyl alcohol are replaced by 1.13 parts of phenol. The phenyl 2-(4-chlorophenyl)thiazol - 4 - ylacetate is dissolved in 50 parts of ether, and 5 parts of saturated ethereal hydrogen chloride are added. The precipitated solid is collected by filtration and crystallised from ethyl acetate. There is thus obtained phenyl 2-(4-chlorophenyl)thiazol-4-ylacetate hydrochloride, M.P. 160° C. (decomposition).

EXAMPLE 40

A solution of 2.5 parts of ethyl 2-(4-chlorophenyl)
A solution of 2.5 parts of ethyl 2-(4-chlorophenyl)-thiazol-4-ylacetate in 15 parts of dry ether is added to a solution of 0.8 part of sodamide in 20 parts of liquid ammonia. The mixture is stirred at −70° C., and a total of 2.52 parts of methyl iodide are added in two equal portions at a 30 minute interval. The mixture is stirred at −70° C. for 1 hour. 2 parts of ammonium chloride are then added, and the ammonia is allowed to evaporate. The ether is evaporated in vacuo, and the residue is boiled with 15 parts of 2 N-sodium hydroxide solution for 3 hours. The resulting solution is cooled, decolourising carbon is added, and the mixture is filtered. The filtrate is acidified with acetic acid and the mixture extracted three times with 20 parts of chloroform. The combined chloroform extracts are washed with water, dried with anhydrous magnesium sulphate, filtered, and evaporated to dryness. The residue is crystallised from cyclohexane, and there is thus obtained α-[2-(4-chlorophenyl)thiazol-4-yl] isobutyric acid, M.P. 136–138° C.

EXAMPLE 41

8.4 parts of 1-bromo-3-(4-chlorophenyl)propane-2-one are added to a solution of 5 parts of ethyl thiocarbamoylacetate in 25 parts of ethanol, and the mixture is heated at boiling point for 1 hour. The ethanol is then distilled off under reduced pressure, and the residue is triturated with ethyl acetate. The undissolved hydrobromide is collected by filtration and boiled under reflux for 2 hours with 50 parts of a 2 N-solution of sodium hydroxide in aqueous ethanol. The solution is diluted with 200 parts of water and is washed with ether. It is then brought to pH 2 by addition of hydrochloric acid. The precipitate is redissolved by extraction into ether, and the ethereal solution is washed with water. The ethereal solution is then extracted with aqueous 2 N-ammonia, and the combined aqueous solutions are stirred with decolourising carbon, filtered, and reacidified to pH 2 by addition of hydrochloric acid. The precipitate is dissolved by extraction with three portions, each of 80 parts, of ether, and the solution is dried over anhydrous magnesium sulphate. The ether is distilled off, the final amount being taken off under reduced pressure to ensure that the temperature does not rise above 35° C., and the residue is 4-(4-chlorobenzyl)thiazol-2-ylacetic acid, which melts with decomposition at 86–87.5° C.

EXAMPLE 42

23.5 parts of α-[4-(4-bromophenyl)thiazol - 2 - yl]propionic acid are stirred with 300 parts of water, and 2 N-aqueous ammonia is added gradually until complete solution is almost obtained. The liquid is clarified by filtration, and the filtrate is stirred whilst a splution of 8.2 parts of calcium chloride hexahydrate in 100 parts of water is slowly added. The calcium salt of α-[4-(4-bromophenyl) thiazol-2-yl]propionic acid is precipitated, and is collected by filtration, washed well with water, and dried over phosphorus pentoxide in vacuo at ambient temperature. The salt is thus obtained as a dihydrate which decomposes at 168–170° C.

EXAMPLE 43

6.25 parts of α-[4-(4-bromophenyl)thiazol-2-yl]propionic acid are stirred in a solution of 1.7 parts of sodium hydrogen carbonate in 60 parts of water. When all the solid has dissolved, the solution is washed twice with 30 parts of ether. The aqueous solution is shaken with decolourising carbon, filtered, and the filtrate is evaporated to dryness under reduced pressure. The residual solid is dissolved in 12 parts of methanol, decolourising carbon is added to the solution, and the mixture is filtered. 110 parts of dry ether are slowly added to the filtrate. Crystals of the sodium salt of α-[4-(4-bromophenyl)thiazol-2-yl]propionic acid separate slowly, and they are collected by filtration, and then dried. The sodium salt decomposes at 229.5–230.5° C. after preliminary darkening.

EXAMPLE 44

A mixture of 2 parts of α-[4-(4-bromophenyl)thiazol-2-yl]propionic acid, 20 parts of methanol and 1 part of sulphuric acid is heated under reflux for 2 hours. The solution is cooled and 75 parts of water are added. The solution is then extracted twice with 40 parts of ether, and the ethereal extract is washed with dilute aqueous sodium carbonate, and then with water. The solution in ether is dried with anhydrous sodium sulphate, and the ether is distilled off to leave an oil which solidifies on cooling. Crystallisation from methanol gives methyl α-[4-(4-bromophenyl)-thiazol-2-yl]propionate, M.P. 62–63° C.

EXAMPLE 45

7 parts of 4-bromophenacyl bromide are added gradually to a warm solution of 3.7 parts of methyl α-thiocarbamoylpropionate in 20 parts of methanol and 2 parts of pyridine. The mixture is boiled under reflux for 1 hour, and the excess of methanol is then distilled off under reduced pressure. The residue is triturated with 40 parts of ethyl acetate, and the mixture is filtered. The filtrate is evaporated to leave an oil which solidifies on cooling. The solid is crystallised from methanol, and there is thus obtained methyl α-[4-(4-bromophenyl)thiazol-2-yl]propionate, M.P. 62° C.

In a similar manner, but using 4-chlorophenacyl bromide instead of 4-bromophenacyl bromide, there is obtained methyl α-[4-(4-chlorophenyl)thiazol-2-yl]propionate, M.P. 40–42° C.

The methyl α-thiocarbamoylpropionate used in these preparations is obtained by the addition of hydrogen sulphide to methyl α-cyanopropionate under conditions similar to those described for the preparation of ethyl α-thiocarbamoylpropionate in Example 22. The methyl ester melts at 101–102° C.

EXAMPLE 46

18.8 parts of 4-bromophenacyl bromide are added slowly to a solution of 11.8 parts of ethyl α-thiocarbamoylisobutyrate in 45 parts of ethanol containing 5.4 parts of pyridine, the whole being at 50° C. The mixture is boiled under reflux for 1 hour, and the ethanol is distilled off under reduced pressure. The residue is stirred with 100 parts of ethyl acetate, and the precipitated pyridine hydrobromide is removed by filtration. The filtrate is evaporated down under reduced pressure, and the residual oil is fractionally distilled in vacuo, the fraction having B.P. 154–165° C./0.1 mm. being collected. The distillate is cooled to bring about crystallisation, and the solid is crystallised from aqueous ethanol to give ethyl α-[4-(4-bromophenyl)thiazol-2-yl]isobutyrate, M.P. 53–54° C.

In a similar manner, but using ethyl α-thiocarbamoylpropionate instead of ethyl α-thiocarbamoylisobutyrate, there is obtained ethyl α-[4-(4-bromophenyl)thiazol-2-yl]propionate, B.P. 150–154° C./0.1 mm.

EXAMPLE 47

7 parts of 4-chlorophenacyl bromide are added gradually to a mixture of 5.25 parts of ethyl α-thiocarbamoylisobutyrate, 2.4 parts of pyridine and 20 parts of ethanol at 50° C. The mixture is boiled under reflux for 1 hour, and the ethanol is then distilled off under reduced pressure. The residue is triturated with 30 parts of ethyl acetate, and the precipitated pyridine hydrobromide is removed by filtration. The ethyl acetate is evaporated under reduced pressure, and the residue is boiled for 1 hour with 40 parts of a 2 N-solution of potassium hydroxide in ethanol. The ethanol is distilled off and 40 parts of water are added. The solution is washed twice with ether, decolourising carbon is added, and the mixture is filtered. The filtrate is brought to pH 3 by addition of dilute hydrochloric acid at 10° C. The resulting precipitate is collected by filtration, washed with water, dried on the filter, and then dissolved in dilute aqueous potassium hydroxide. The solution is decolourised with carbon and filtered, and is then brought to pH 3 by addition of dilute aqueous hydrochloric acid at 10° C. The precipitated α-[4-(4-chlorophenyl)thiazol-2-yl]isobutyric acid is collected py filtration, washed with water, and dried in vacuo over phosphorus pentoxide at ambient temperature. The acid decomposes at 89.5–90.5° C.

EXAMPLE 48

The process described in Example 1 is repeated except that the 4-bromophenacyl bromide is replaced by 3-chlorophenacyl bromide. In a similar manner there is obtained ethyl 4-(3-chlorophenyl)thiazol-2-ylacetate, M.P. 78–78.5° C.

EXAMPLE 49

The process described in Example 21 is repeated except that the 4-fluorophenacyl bromide is replaced by 3-chlorophenacyl bromide. In a similar manner there is obtained 4-(3-chlorophenyl)thiazol-2-ylactic acid, M.P. 102–103° C. (decomposition).

EXAMPLE 50

The process described in Example 22 is repeated except that the ethyl α-thiocarbamoylpropionate is replaced by ethyl α-thiocarbamoylbutyrate (M.P. 72° C., crystallised from carbon tetrachloride). In a similar manner there is obtained α-[4-(4-bromophenyl)thiazol-2-yl]butyric acid, M.P. 65–67° C. (decomposition).

EXAMPLE 51

2 parts of 2-(4-chlorophenyl)thiazol-4-ylacetamide are boiled under reflux with 20 parts of 6 N-hydrochloric acid for 2 hours. The mixture is cooled, basified with concentrated ammonium hydroxide, and filtered. The filtrate is acidified with acetic acid, and the mixture is filtered. The solid residue is washed with water, dried, and crystallised from ethyl acetate. There is thus obtained 2-(4-chlorophenyl)thiazol-4-ylacetic acid, M.P. 156° C.

EXAMPLE 52

The process described in Example 26 is repeated except that the 4-(4-bromophenyl)thiazol-2-ylacetic acid is replaced by α-[4-(4-bromophenyl)thiazol-2-yl]propionic acid. In a similar manner there is obtained β-diethylaminoethyl α-[4-(4-bromophenyl)thiazol-2-yl]propionate as a liquid, which forms a solid dihydrobromide monohydrate, decomposing at 127–130° C.

EXAMPLE 53

8 parts of phenacyl bromide are added to a solution of 5.9 parts of ethyl thiocarbamoylacetate in 15 parts of ethanol at 50° C. The mixture is heated under reflux for 45 minutes, and then cooled and diluted with 50 parts of ether. The precipitate is collected by filtration, suspended in 60 parts of aqueous 2 N potassium hydroxide, and extracted with ether. The ethereal extract is dried over anhydrous sodium sulphate, and ethanolic hydrogen chloride is then added until precipitation is complete. The mixture is filtered and there is obtained as solid residue ethyl 4-phenylthiazol-2-ylacetate hydrochloride, M.P. 98–101° C. (decomposition).

EXAMPLE 54

12.3 parts of thiobenzamide are added to a mixture of 28.2 parts of ethyl γ-bromoacetoacetate and 45 parts of ethyl acetate, and the resulting mixture is heated under reflux for 30 minutes. The ethyl acetate is evaporated under reduced pressure, and the residual oil is stirred with ether and sufficient dilute aqueous sodium bicarbonate to give an alkaline medium. The ethereal layer is separated, and the aqueous layer is extracted three times with 40 parts of ether. The combined ethereal solution and extracts are dried over anhydrous magnesium sulphate. The mixture is filtered and the filtrate evaporated to dryness. The residual red oil is dissolved in n-butanol, and a solution of hydrogen chloride in ether is added. The mixture is filtered and the solid residue is dissolved in warm n-butanol. Ether is added to the solution until precipitation is complete. The mixture is filtered and there is obtained, as solid residue, ethyl 2-phenylthiazol-4-ylacetate hydrochloride, M.P. 143–145° C.

EXAMPLE 55

A mixture of 100 parts of 4-(4-bromophenyl)thiazol-2-ylacetic acid and 300 parts of maize starch is granulated with a sufficient quantity of 10% w./v. starch paste. The granules are passed through a 20-mesh screen and are dried at a temperature not exceeding 50° C. The dried granules are blended with 4 parts of magnesium stearate and are compressed into tablets which may contain from 50 to 250 mg. of active ingredient. There are thus obtained tablets suitable for oral use for therapeutic purposes.

Instead of the 100 parts of 4-(4-bromophenyl)thiazol-2-ylacetic acid there may be used 100 parts of 2-phenylthiazol-4-ylacetic acid, and in a similar manner there are obtained tablets suitable for oral administration for therapeutic purposes.

EXAMPLE 56

The process described in Example 55 is repeated except that the 4-(4-bromophenyl)thiazol-2-ylacetic acid is replaced by 4-phenylthiazol-2-ylacetic acid or methyl 4-phenylthiazol-2-ylacetate hydrochloride. There are thus obtained tablets suitable for oral use for therapeutic purposes.

EXAMPLE 57

50 parts of micronised 2-(4-chlorophenyl)thiazol-4-ylacetic acid is mixed with 130 parts of lactose and 35 parts of a 10% w./v. aqueous gelatine solution, and the mixture is granulated. 24.5 parts of maize starch are mixed with the granules, and 2 parts of magnesium stearate are then added. The mixture is compressed into tablets containing 50 mg. of active ingredient. There are thus obtained tablets which are suitable for oral administration for therapeutic purposes.

EXAMPLE 58

5 parts of 2-(4-chlorophenyl)thiazol-4-ylacetic acid are added to a stirred mixture of 9 parts of liquid paraffin and 86 parts of white soft paraffin heated at 65° C. Stirring is continued until the mixture is cool, and there is thus obtained an ointment suitable for topical application for therapeutic purposes.

EXAMPLE 59

To a stirred mixture of 20 parts of stearic acid, 15 parts of arachis oil, 5 parts of liquid paraffin and 0.5 part of cetostearyl alcohol heated at 65° C. there is added a solution at 60° C. prepared from 5 parts of 2-(4-chlorophenyl)thiazo-4-ylacetic acid, 0.75 part of triethanol-amine and 53.75 parts of water, and stirring is continued after mixing while the temperature is allowed to fall to 40° C. The mixture is then homogenised by passage through a colloid mill and there is thus obtained a vanishing cream suitable for topical application for therapeutic purposes.

The thiazole derivatives which can be used as active ingredients in the pharmaceutical compositions of this invention are active in procedures that are standard in the art for testing for anti-inflammatory agents, for analgesic agents, for antipyretic agents, and for agents which reduce the concentration of fibrinogen and cholesterol and/or triglycerides in blood. These results were obtained in standard experimental animals (rats or mice), and they presumptively indicate corresponding utilities in man. On the basis of these results in standard experimental animals and data obtained in related laboratory studies, we consider that it is reasonable to expect that pharmaceutical compositions of this invention could be used clinically in man in the following forms and at the following doses, depending upon the clinical effect that is desired:

(1) Anti-inflammatory effect.—The agent is expected to be administered orally, for example in tablet form, and the total daily oral dose is expected to be 100–150 mg. of active ingredient, for example 2-(4-chlorophenyl)thiazol-4-ylacetic acid, per 70 kg. man per day. Alternatively, the agent is expected to be administered topically in the form of, for example, an ointment or cream containing 2.5–7.5% by weight of active ingredient, for example 2-(4-chlorophenyl)thiazol-4-ylacetic acid, which would be administered as necessary.

(2) Analgesic effect.—The agent is expected to be administered orally, for example in tablet form, and the total daily oral dose is expected to be 100–600 mg. of active ingredient, for example 2-(4-chlorophenyl)thiazol-4-ylacetic acid, per 70 kg. man per day.

(3) Antipyretic effect.—The agent is expected to be administered orally, for example in tablet form, and the total daily oral dose is expected to be 100–500 mg. of active ingredient, for example 2-(4-chlorophenyl)thiazol-4-ylacetic acid, per 70 kg. man per day.

(4) Effect upon concentration of fibrinogen, cholesterol or triglycerides in blood.—The agent is expected to be administered orally, for example in tablet form, and the total daily oral dose is expected to be 400–900 mg. of active ingredient, for example 2-(4-chlorophenyl)thiazol-4-ylacetic acid, per 70 kg. man per day.

What we claim is:

1. As a pharmaceutical composition of matter, a pharmecutically effective amount of a thiazole derivative of the formula:

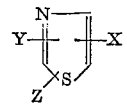

wherein either Y or Z is in the 2-position of the thiazole nucleus; and X is hydrogen or methyl; and Y is phenyl, phenyl substituted by not more than two halogen atoms selected from fluorine, chlorine and bromine atoms, p-nitrophenyl, p-trifluoromethylphenyl, benzyl or p-chlorobenzyl; and Z stands for a group of the formula

wherein $R^1$ is hydrogen or methyl, $R^2$ is hydrogen or methyl, and $R^3$ is cyano, carboxy, alkoxy-carbonyl wherein the alkoxy contains 1 to 5 carbon atoms, (2-hydroxyethoxy) carbonyl, (2-diethylaminoethoxy)-carbonyl, benzyloxycarbonyl, phenoxycarbonyl, carbamoyl, N-hydroxycarbamoyl, N-aminocarbamoyl, N-(2-diethylaminoethyl)-carbamoyl, N-(methoxycarbonylmethyl)carbamoyl or N-

(carboxymethyl) carbamoyl; or a pharmaceutically acceptable salt thereof; together with a major amount of a pharmaceutically acceptable diluent or carrier.

2. A pharmaceutical composition of matter as claimed in claim 1 wherein the thiazole derivative is 2-(4-chlorophenyl) thiazol-4-ylacetic acid.

3. A method of effecting an anti-inflammatory, analgesic or antipyretic action in man or of reducing the concentration of fibrinogen, cholesterol or triglycerides in the blood of man, which comprises the administration to man of an amount sufficient to effect said action or reduction, of a thiazole derivative of the formula stated in claim 1 or a pharmaceutically-acceptable salt thereof.

4. A method as claimed in claim 3 wherein the thiazole derivative is 2-(4-chlorophenyl)thiazol-4-ylacetic acid.

References Cited
UNITED STATES PATENTS 2,020,650   11/1935   Johnson _____ 260—302

STANLEY J. FRIEDMAN, Primary Examiner